UNITED STATES PATENT OFFICE.

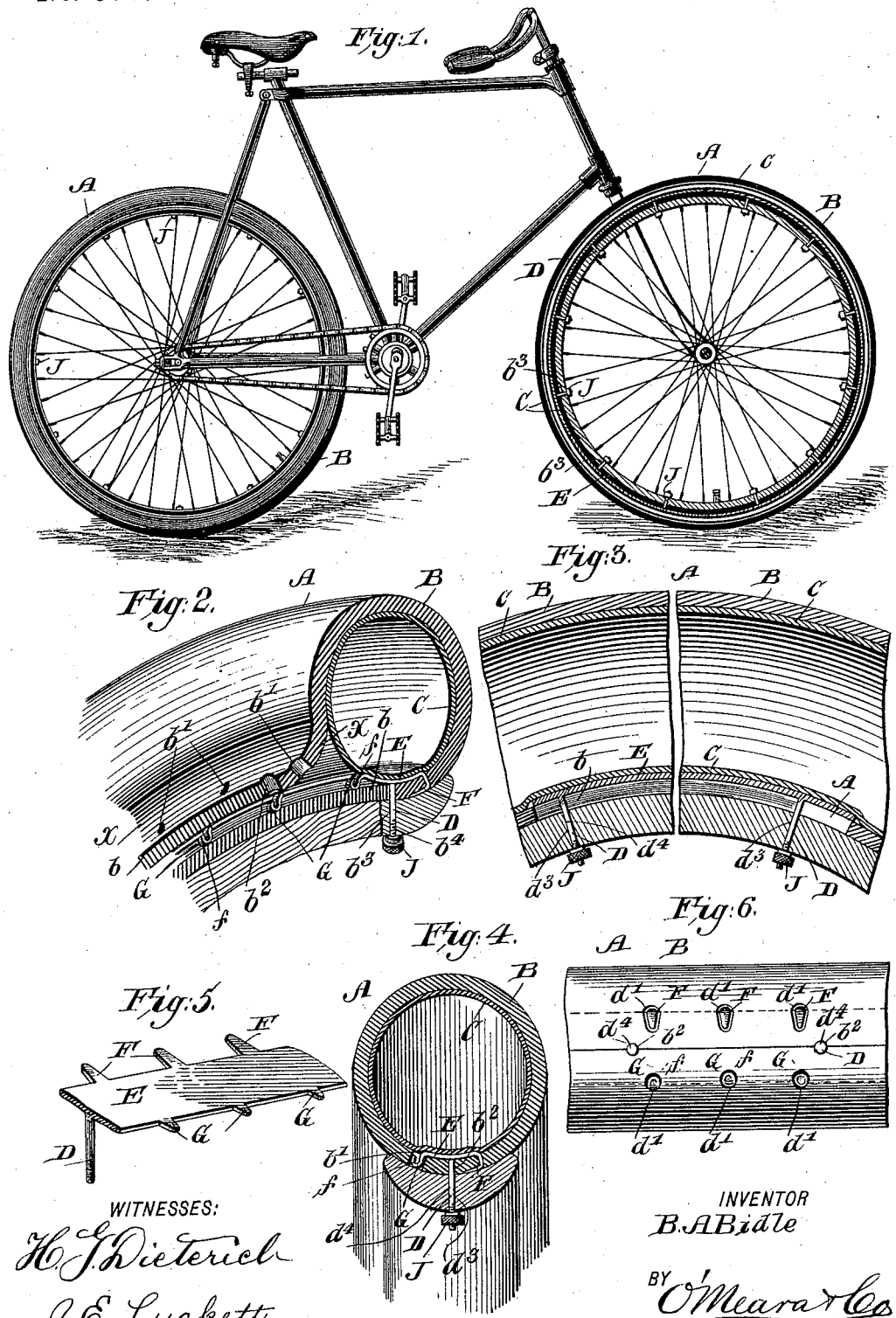

BENJAMIN A. BIDLE, OF ABBEYVILLE, OHIO.

PNEUMATIC BICYCLE-TIRE.

SPECIFICATION forming part of Letters Patent No. 576,772, dated February 9, 1897.

Application filed May 31, 1895. Renewed January 12, 1897. Serial No. 619,016. (No model.)

*To all whom it may concern:*

Be it known that I, BENJAMIN A. BIDLE, residing at Abbeyville, in the county of Medina and State of Ohio, have invented certain new and useful Improvements in Pneumatic Bicycle-Tires, of which the following is a specification.

My invention relates more particularly to that class of bicycle-tires which have a laced connection for the opening through which the inner tube is removed or inserted; and it primarily has for its object to provide a bicycle-tire of this kind of a simple and economical construction in which the several parts can be readily attached or detached and which when adjusted in position will effectively serve for its intended purposes.

Furthermore my invention has for its object to provide a tire having the several parts so arranged that the outer tube can be conveniently opened up or separated at any point desired without entirely detaching the lacing or securing means and in which the lacing or securing means are so arranged that the said outer tube can be quickly fitted in position.

With other objects in view, which hereinafter will appear, the invention consists in the peculiar construction and novel arrangement of parts hereinafter first described in detail, and then specifically pointed out in the appended claim, reference being had to the accompanying drawings, in which—

Figure 1 is a view of a bicycle equipped with my improved tire, parts being shown in section to better illustrate the invention. Fig. 2 shows a portion of a bicycle-tire constructed in accordance with my invention, the several parts being shown in a separated condition. Fig. 3 is a longitudinal section of my bicycle-tire, showing the same with but a short opening or slit and a single cover or lace-plate. Fig. 4 is a transverse section of the same on a slightly-enlarged scale. Fig. 5 is a perspective view of one of the lace or securing plates detached, and Fig. 6 is an inverted view of a portion of the tire.

Referring to the accompanying drawings, A indicates the wheel-rim, such as is of any preferred construction suitable to receive the tube and admit of its being secured thereto without cementing.

B indicates the outer tubing, and C the inner tube. The outer tube, which may be slitted entirely around, as shown in Fig. 1, or only at one point, as shown in Fig. 3, has adjacent the slit $b$, at each side thereof, a series of lacing-apertures $b'$ $b'$ and at suitable intervals semicircular recesses $b^2$ $b^2$, arranged to register to form apertures through which the securing-bolts D, presently referred to, pass, such outer rim also having openings $b^3$ to receive the main or rim bolts $b^4$.

The lacing or securing means, the particular construction of which forms an essential feature of this invention, comprises a thin plate E, of any suitable material and of suitable lengths, on the under face of which is secured in any manner pendent bolts D, the lower ends of which are threaded at $d$, as most clearly shown in Fig. 4. The plate E has at the edges, stamped or otherwise formed, a series of lateral fingers or hook members F and G, the ones F being longer than the ones G, for a purpose presently explained.

When the outer tube B has a continuous slit, as shown in Fig. 1, a series of lacing-plates E are used, made of such lengths uniformly as to abut at the ends and to form practically a continuous lacing member. When, however, the said outer tube has a single slit, as shown in Fig. 3, the length of the plate E is practically the same as the slit. (See Fig. 5.)

By referring now more particularly to Fig. 4 it will be observed the plate E is fitted on the inside of the tube B over the slit, lapping over each side thereof, the long hook members being projected through the apertures $b'$ at one side and clenched under the tube between it and the rim of the wheel, which serves to hold the said plate in a positive and true clamped position, the clamping operation being maintained by the milled nut J. The short hook members G of the plate are bent up to form eye-hook like portions $f$, having a smooth under or contact face which serves a double purpose. First, it permits the end $x$ of the outer tube to be more freely slipped over the said hook ends $f$ without danger of cutting or tearing the tube, there being no sharp end to engage same, and, secondly, the turned-up end forms a positive hook end which forms a rounded surface to the lace-holes of the tire and facilitates the slipping of the tire into the said hook portions.

From the foregoing, taken in connection with the accompanying drawings, it will be readily seen that my improved bicycle-tire can be quickly fitted in place, and when clamped to the rim it will be positively held from "creeping." Furthermore, by connecting the plate to the lace-holes of the tire in the manner described should the inner tube be punctured it is only necessary to loosen the pressure of the lace-plate by manipulating the nut J sufficiently to permit the end $x$ of the tire being pulled off of the hook $f$ sufficiently to allow the inner tube to be drawn out for repairs.

Having thus described my invention, what I claim, and desire to secure by Letters Patent, is—

The combination with the inner tube and wheel-rim, of an outer tube, split longitudinally and having a series of perforations produced therein adjacent each edge, and a clamping-plate E having fingers F and G, and depending stem D, adapted to pass through the rim and receive the nut J, the fingers F and G being flexible, the fingers F being longer than G and passed through and under the outer tube while the fingers G are bent back upon themselves and hooked into the perforations of the opposite edge, whereby the outer tube can be quickly and easily attached to and detached from the said fingers G substantially as shown and described.

BENJAMIN A. BIDLE.

Witnesses:
EDWARD SINGLER,
ALBERT E. BIDLE.